(12) United States Patent
Thistle et al.

(10) Patent No.: US 10,570,749 B2
(45) Date of Patent: Feb. 25, 2020

(54) GAS TURBINE BLADE WITH PEDESTAL ARRAY

(71) Applicant: United Technologies Corporation, Farmington, CT (US)

(72) Inventors: Charles Thistle, Middletown, CT (US); Yongxiang D. Xue, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 212 days.

(21) Appl. No.: 15/004,498

(22) Filed: Jan. 22, 2016

(65) Prior Publication Data

US 2017/0211394 A1 Jul. 27, 2017

(51) Int. Cl.
| | |
|---|---|
| *F01D 5/18* | (2006.01) |
| *F01D 5/14* | (2006.01) |
| *F01D 9/04* | (2006.01) |
| *F01D 25/12* | (2006.01) |

(52) U.S. Cl.
CPC ............. *F01D 5/187* (2013.01); *F01D 5/147* (2013.01); *F01D 9/041* (2013.01); *F01D 25/12* (2013.01); *F05D 2220/32* (2013.01); *F05D 2230/60* (2013.01); *F05D 2240/81* (2013.01);
(Continued)

(58) Field of Classification Search
CPC .......... F01D 5/147; F01D 5/187; F01D 25/12; F05D 2240/304; F05D 2260/2212; F05D 2260/22141
See application file for complete search history.

(56) References Cited

U.S. PATENT DOCUMENTS

| | | | | |
|---|---|---|---|---|
| 4,940,388 A | * | 7/1990 | Lilleker | F01D 5/187 416/97 R |
| 7,938,624 B2 | * | 5/2011 | Tibbott | F01D 5/187 415/115 |

(Continued)

FOREIGN PATENT DOCUMENTS

| | | |
|---|---|---|
| EP | 1467065 A2 | 10/2004 |
| EP | 1548230 A2 | 6/2005 |

(Continued)

OTHER PUBLICATIONS

European Search Report for Application No. EP 17 15 2705 dated Jul. 10, 2017; 8 pages.

*Primary Examiner* — Dwayne J White
*Assistant Examiner* — Danielle M. Christensen
(74) *Attorney, Agent, or Firm* — Cantor Colburn LLP

(57) ABSTRACT

A component for a gas turbine engine is provided. The component having: a platform; an airfoil secured to and extending radially from the platform, the airfoil having an exterior surface extending from a leading edge and a trailing edge; an internal cooling cavity located within the airfoil; and a first row of pedestals extending between opposite sides of the internal cavity and a second row of pedestals adjacent to the first row of pedestals and extending between opposite sides of the internal cavity, wherein the first row of pedestals are further from the trailing edge than the second row of pedestals and a lowermost pedestal of the first row of pedestals is further from the platform than a lowermost pedestal of the second row of pedestals.

20 Claims, 3 Drawing Sheets

(52) U.S. Cl.
CPC .............. *F05D 2260/202* (2013.01); *F05D 2260/22141* (2013.01)

(56) References Cited

U.S. PATENT DOCUMENTS

| | | | | |
|---|---|---|---|---|
| 2004/0202542 | A1* | 10/2004 | Cunha | ............... B22C 9/103 |
| | | | | 416/97 R |
| 2008/0050243 | A1 | 2/2008 | Liang | |
| 2013/0232991 | A1* | 9/2013 | Otero | ............... F01D 5/187 |
| | | | | 60/806 |
| 2013/0280080 | A1* | 10/2013 | Levine | ............... F01D 5/187 |
| | | | | 416/223 R |

FOREIGN PATENT DOCUMENTS

| | | |
|---|---|---|
| EP | 1918522 A2 | 5/2008 |
| EP | 2713010 | 4/2014 |
| WO | 2013138009 A1 | 9/2013 |

\* cited by examiner

GAS TURBINE BLADE WITH PEDESTAL ARRAY

BACKGROUND

This disclosure relates generally to gas turbine engines and, more particularly, to cooling techniques for airfoil sections of turbine blades of the engine.

In general, gas turbine engines are built around a power core comprising a compressor, a combustor and a turbine, which are arranged in flow series with a forward (upstream) inlet and an aft (downstream) exhaust. The compressor compresses air from the inlet, which is mixed with fuel in the combustor and ignited to produce hot combustion gases. The hot combustion gases drive the turbine section, and are exhausted with the downstream flow.

The turbine drives the compressor via a shaft or a series of coaxially nested shaft spools, each driven at different pressures and speeds. The spools employ a number of stages comprised of alternating rotor blades and stator vanes. The vanes and blades typically have airfoil cross sections, in order to facilitate compression of the incoming air and extraction of rotational energy in the turbine. The blades are secured to the rotor disk through a blade platform.

High combustion temperatures also increase thermal and mechanical loads, particularly on turbine airfoils and associated platforms downstream of the combustor. This reduces service life and reliability, and increases operational costs associated with maintenance and repairs.

The trailing edge of the blade has been cooled by directing air into an internal cavity proximate to the trailing edge. However, the intersection of the trailing edge of the blade to the platform is also an area of highly localized stress due to centrifugal loads.

Accordingly, it is desirable to provide cooling to the blade proximate to the trailing edge of the airfoil without increasing localized stresses beyond their limits.

BRIEF DESCRIPTION

In one embodiment, a component for a gas turbine engine is provided. The component having: a platform; an airfoil secured to and extending radially from the platform, the airfoil having an exterior surface extending from a leading edge and a trailing edge; an internal cooling cavity located within the airfoil; and a first row of pedestals extending between opposite sides of the internal cavity and a second row of pedestals adjacent to the first row of pedestals and extending between opposite sides of the internal cavity, wherein the first row of pedestals are further from the trailing edge than the second row of pedestals and a lowermost pedestal of the first row of pedestals is further from the platform than a lowermost pedestal of the second row of pedestals.

In addition to one or more of the features described above, or as an alternative to any of the foregoing embodiments, a surface of the pedestals facing the platform may be configured to have a flat surface extending between the opposite sides of the internal cavity.

In addition to one or more of the features described above, or as an alternative to any of the foregoing embodiments, a surface of the pedestals facing the platform may be configured to have a curved surface extending between the opposite sides of the internal cavity.

In addition to one or more of the features described above, or as an alternative to any of the foregoing embodiments, the first row of pedestals may be aligned with each other.

In addition to one or more of the features described above, or as an alternative to any of the foregoing embodiments, the second row of pedestals may be aligned with each other and parallel to the first row of pedestals.

In addition to one or more of the features described above, or as an alternative to any of the foregoing embodiments, a surface of the pedestals facing the platform may be configured to have either a flat surface extending between the opposite sides of the internal cavity or a curved surface extending between the opposite sides of the internal cavity.

In addition to one or more of the features described above, or as an alternative to any of the foregoing embodiments, a third row of pedestals may be provided, wherein the third row of pedestals are closer to the trailing edge than the second row of pedestals and the lowermost pedestal of the second row of pedestals is further from the platform than a lowermost pedestal of the third row of pedestals.

In addition to one or more of the features described above, or as an alternative to any of the foregoing embodiments, the component may be a rotor blade of a gas turbine engine.

In addition to one or more of the features described above, or as an alternative to any of the foregoing embodiments, the blade may have a plurality of cooling openings in the exterior surface of the blade proximate to the trailing edge, wherein the plurality of cooling openings are in fluid communication with the internal cooling cavity.

In yet another embodiment, a blade for a gas turbine engine is provided. The blade having: an airfoil; a platform secured to the airfoil, the airfoil having an exterior surface extending from a leading edge to a trailing edge; an internal cooling cavity located within the airfoil; and an array of pedestals extending between opposite sides of the internal cavity, the array of pedestals including a first row of pedestals and a second row of pedestals adjacent to the first row of pedestals, wherein the first row of pedestals are further from the trailing edge than the second row of pedestals and a lowermost pedestal of the first row of pedestals is further from the platform than a lowermost pedestal of the second row of pedestals.

In addition to one or more of the features described above, or as an alternative to any of the foregoing embodiments, a surface of the pedestals facing the platform may be configured to have a flat surface extending between the opposite sides of the internal cavity.

In addition to one or more of the features described above, or as an alternative to any of the foregoing embodiments, a surface of the pedestals facing the platform may be configured to have a curved surface extending between the opposite sides of the internal cavity.

In addition to one or more of the features described above, or as an alternative to any of the foregoing embodiments, the first row of pedestals may be aligned with each other.

In addition to one or more of the features described above, or as an alternative to any of the foregoing embodiments, the second row of pedestals may be aligned with each other and parallel to the first row of pedestals.

In addition to one or more of the features described above, or as an alternative to any of the foregoing embodiments, a surface of the pedestals facing the platform may be configured to have either a flat surface extending between the opposite sides of the internal cavity or a curved surface extending between the opposite sides of the internal cavity.

In addition to one or more of the features described above, or as an alternative to any of the foregoing embodiments, the array of pedestals may further include a third row of pedestals, wherein the third row of pedestals are closer to the trailing edge than the second row of pedestals and the lowermost pedestal of the second row of pedestals is further from the platform than a lowermost pedestal of the third row of pedestals.

In addition to one or more of the features described above, or as an alternative to any of the foregoing embodiments, the blade may have a plurality of cooling openings in the exterior surface of the blade proximate to the trailing edge, wherein the plurality of cooling openings are in fluid communication with the internal cooling cavity.

In yet another embodiment, a method of forming a cooling path in a blade of a gas turbine engine is provided. The method including the steps of: fluidly coupling an exterior surface of the blade to an internal cooling cavity located in the airfoil via a plurality of openings in the airfoil proximate to a trailing edge of the airfoil; and locating an array of pedestals within the internal cooling cavity, the array of pedestals extending between opposite sides of the internal cavity and including a first row of pedestals and a second row of pedestals, the second row of pedestals being adjacent to the first row of pedestals, wherein the first row of pedestals are further from the trailing edge than the second row of pedestals and a lowermost pedestal of the first row of pedestals is further from a platform secured to the blade than a lowermost pedestal of the second row of pedestals.

In addition to one or more of the features described above, or as an alternative to any of the foregoing embodiments, the array of pedestals may further include a third row of pedestals, wherein the third row of pedestals are closer to the trailing edge than the second row of pedestals and the lowermost pedestal of the second row of pedestals is further from the platform than a lowermost pedestal of the third row of pedestals.

In addition to one or more of the features described above, or as an alternative to any of the foregoing embodiments, the first row of pedestals may be aligned with each other and wherein the second row of pedestals are aligned with each other and parallel to the first row of pedestals.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to cooling techniques for airfoil sections of gas turbine components such as vanes or blades of the engine. In particular, the present application is directed to cooling techniques for airfoil blades.

Figure 1:
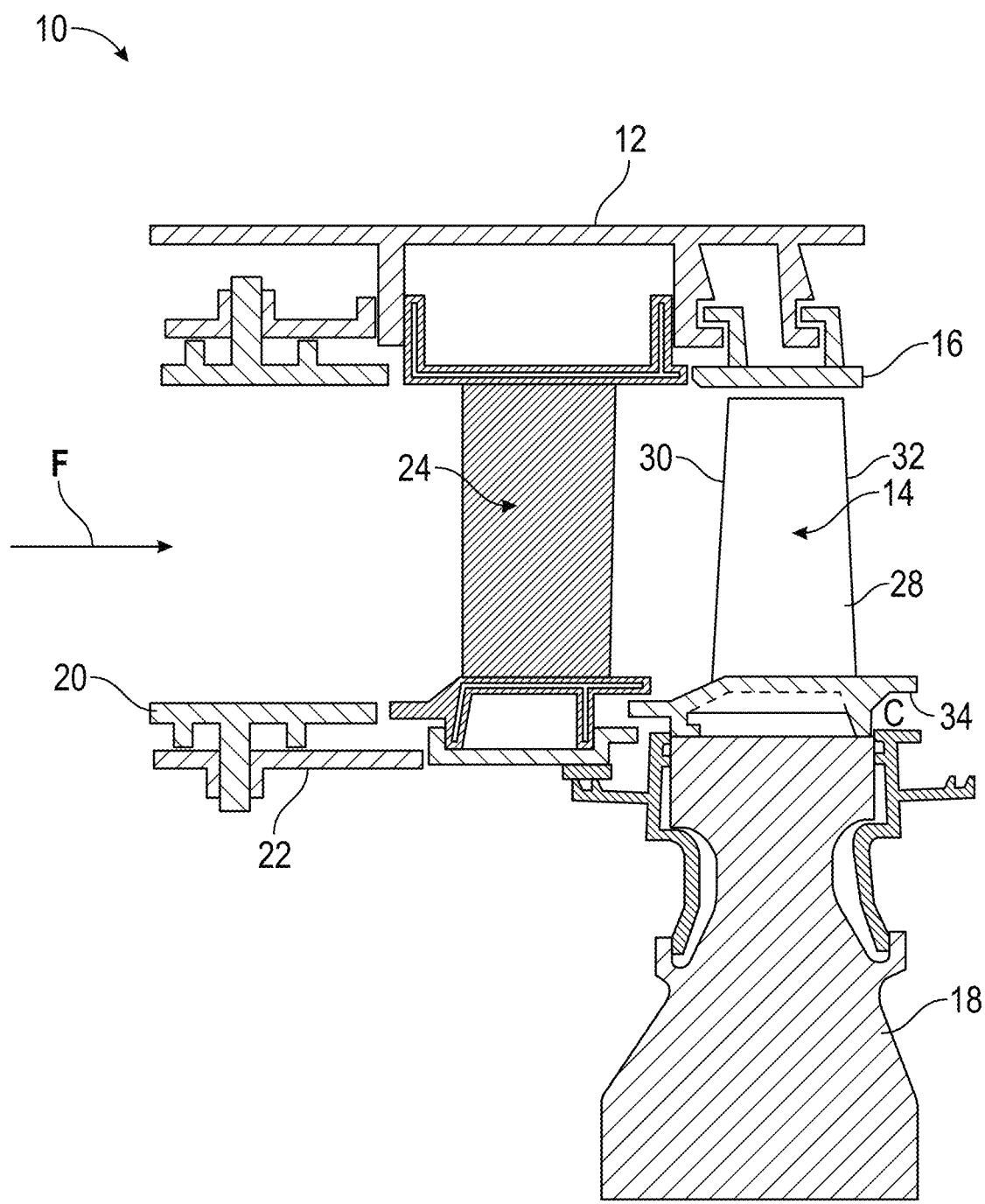
FIG. 1 is a cross-sectional view of a portion of a gas turbine engine.

FIG. 1 is a cross-sectional view of a portion of a gas turbine engine 10 wherein various components of the engine 10 are illustrated. These components include but are not limited to an engine case 12, a rotor blade 14, a blade outer air seal (BOAS) 16, a rotor disk 18, a combustor panel 20, a combustor liner 22 and a vane 24. As mentioned above, rotor blade or component 14 is subjected to high thermal loads due to it being located downstream of a combustor of the engine 10. Thus, it is desirable to provide cooling to the airfoils of the engine.

In order to provide cooling air to the blade 14 and as illustrated in the attached FIGS., a plurality of cooling openings or cavities 26 are formed within an airfoil 28 of the blade 14. The cooling openings or cavities 26 are in fluid communication with a source of cooling air so that thermal loads upon the blade 14 can be reduced. In one non-limiting example, the cooling air is provided from a compressor section of the gas turbine engine. In turbofan embodiments, the cooling fluid may be provided from a compressed air source such as compressor bleed air. In ground-based industrial gas turbine embodiments, other fluids may also be used.

Figure 2:
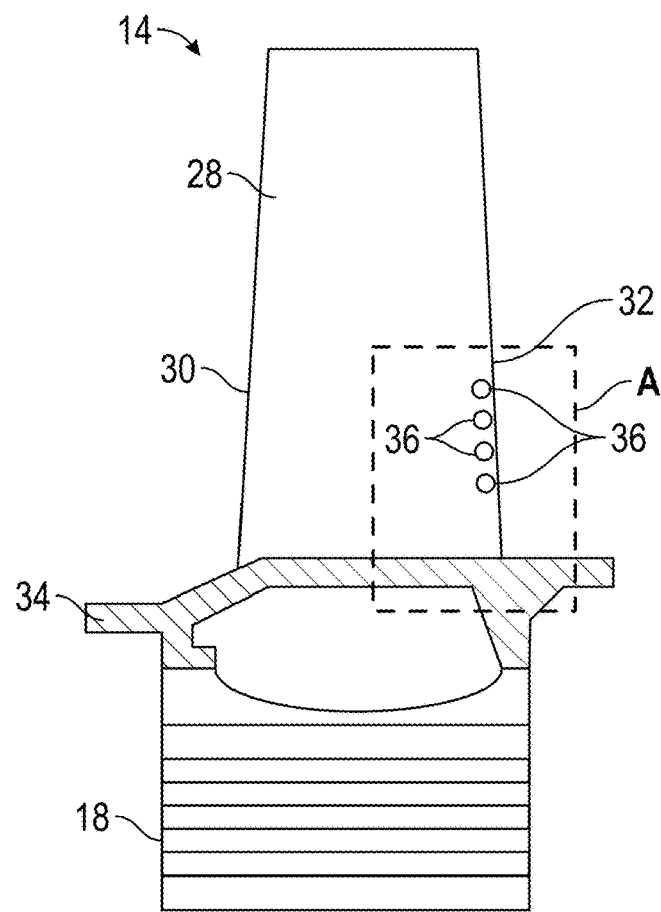
FIG. 2 is a view of an airfoil illustrated in FIG. 1.

The airfoil 28 extends axially between a leading edge 30 and a trailing edge 32 and radially from a platform 34. The internal cooling passages 26 are defined along internal surfaces 27 of the airfoil 28, as seen at least in FIGS. 2A and 2B. The airfoil 28 is exposed to a generally axial flow of combustion gas F, which flows across airfoil section 28 from leading edge 30 to trailing edge 32.

As mentioned above and in order to provide cooling fluids to the airfoil, an internal cavity or cavities 26 is/are located within the airfoil 28. The cavity or cavities 26 are formed within airfoil 28 and are in fluid communication with a source of cooling air so that thermal loads upon the airfoil 28 can be reduced. Still further and in one embodiment, a plurality of trailing edge windows, trailing edge cutback slots, or trailing edge center discharge slots 36 are located proximate to the trailing edge 32 of the airfoil 28 and are in fluid communication with the internal cavity or cavities 28 as well as a supply of cooling air provided thereto in order to keep the cooling air flowing through the internal cavity or cavities 26 in such a way that limits the adverse effects on the aerodynamics of the airfoil 28. As such, these trailing edge windows, trailing edge cutback slots, or trailing edge center discharge slots 36 are in fluid communication with the cavity or cavities 26 such that cooling air may flow to an exterior surface of the airfoil 28. In one embodiment, these trailing edge windows, trailing edge cutback slots, or trailing edge center discharge slots 36 36 are located proximate to the trailing edge 32 such that cooling air may flow in the direction of arrow 35 into the cavity 26 and out of the cavity 26 in the direction of arrow 37 via trailing edge windows, trailing edge cutback slots, or trailing edge center discharge slots 36.

In one embodiment, a plurality of pedestals 38 are located/formed within openings or cavities 26 of the airfoil 28. The pedestals 38 may join a pressure side wall 39 and a suction side wall 41 of the airfoil 28. The primary role of the pedestals 38 is to increase cooling efficiency by picking up the benefit of the cooling air through convection and transferring it to the airfoil walls 39, 41 by conduction. The pedestals 38 also help tie together the pressure side 39 and suction side walls 41 and increase the airfoil stiffness. Also shown is that a plurality of reduced sized air flow paths 40 are located between the plurality of pedestals 38.

Pedestals that are located in the trailing edge cooling passages help cool the hot airfoil walls however they are also subject to high concentrated stresses. These stresses are typically higher near the inner diameter (ID) of the pedestal arrays with respect to the platform due to the increased centrifugal loads there. Also and in general, a greater amount of load is carried adjacent to the pedestal rows furthest away from the trailing edge 32 and so the stresses are higher in these pedestals as well.

As such, the pedestals 38 that are subject to the highest stresses are those closer to the ID and those further away from the trailing edge 32. This area is illustrated by dashed lines or area 42 depicted in FIG. 2A.

Figure 2A:
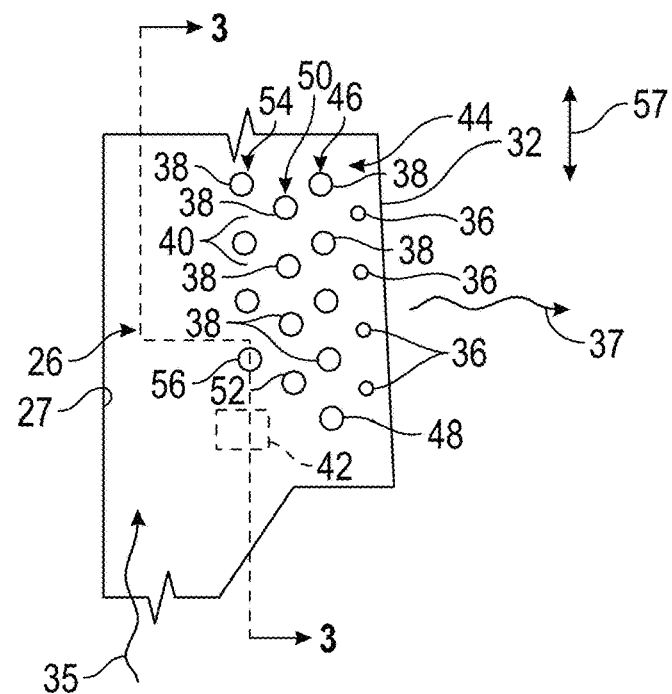
FIG. 2A is an enlarged interior view of the airfoil illustrated in FIG. 2.

In accordance with one embodiment of the present disclosure, a design concept has been developed wherein the pedestals 38 with an inner most inner diameter ID (with respect to an axis of the rotor 18 or with respect to the platform 34) of the pedestals 38 in an array of pedestals 44 are staggered so that those furthest from the trailing edge 32 are higher than those closer to it. For example and as illustrated in FIG. 2A, a first row of pedestals 54 are furthest from the trailing edge 32 and have a lowermost pedestal 56 closest to the platform 34. Thereafter, a second row of pedestals 50 are closer to the trailing edge 32 than the first row of pedestals 54 and have a lowermost pedestal 52 further away from the platform 34 than lowermost pedestal 48. Still further, a third row of pedestals 46 are closest to the trailing edge 32 than the second row of pedestals 50 and have a lowermost pedestal 48 further away from the platform 34 than lowermost pedestal 52. As used herein and in one non-limiting embodiment, a row of pedestals is intended to describe a set or plurality of pedestals aligned with each other and extending generally in the direction of arrows 57 illustrated in FIG. 2A. In yet another embodiment, a row of pedestals is intended to be described as a set or plurality of pedestals generally although not exactly aligned with each other and extending generally in the direction of arrows 57 illustrated in FIG. 2A. Still further and in one non-limiting embodiment, a row of pedestals may refer to a plurality of pedestals extending axially or radially away from a center line of the engine 10 or a rotor disk 18 of the engine 10.

Staggering the rows of the pedestals in this way allows the load to be shared more evenly among the lowermost pedestals 48, 52 and 56 of all the rows. Although three rows are illustrated it is, of course, contemplated that more than three rows of pedestals may be used in various embodiments of the present disclosure. Still further and in yet another embodiment, only a pair of rows of pedestals may be employed.

Accordingly, a trailing edge pedestal array 44 of any size may be employed, where the ID-most or lowermost pedestals 48, 52 and 56 are staggered so that the "bottom" of the pedestal furthest from the trailing edge 32 is higher than the bottom of the lowermost pedestal of an adjacent row, and so on until the last pedestal row is reached.

Figure 3A:
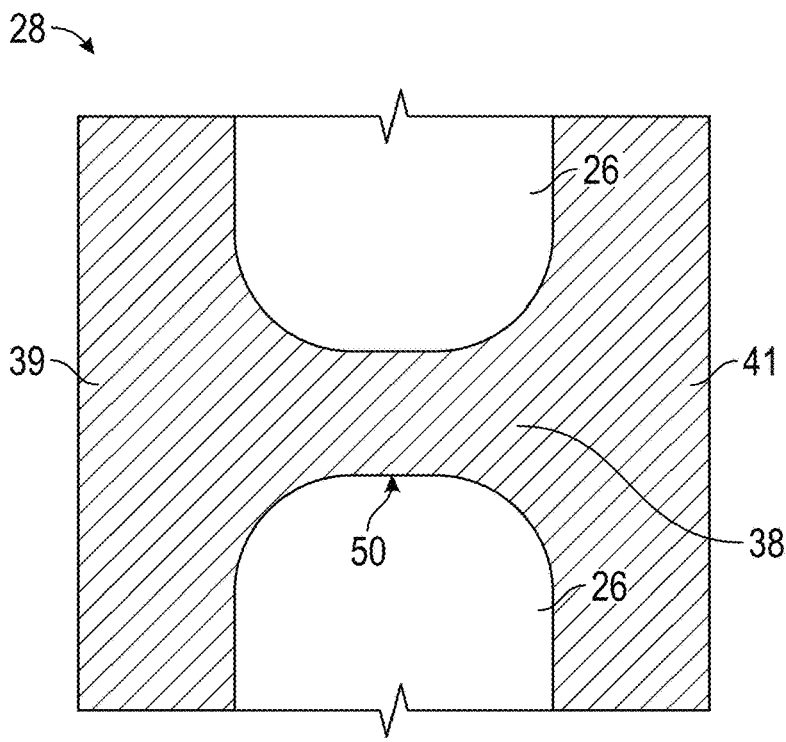
FIG. 3A is a cross-sectional view of the airfoil along lines 3-3 of FIG. 2A according to one embodiment.
Figure 3B:
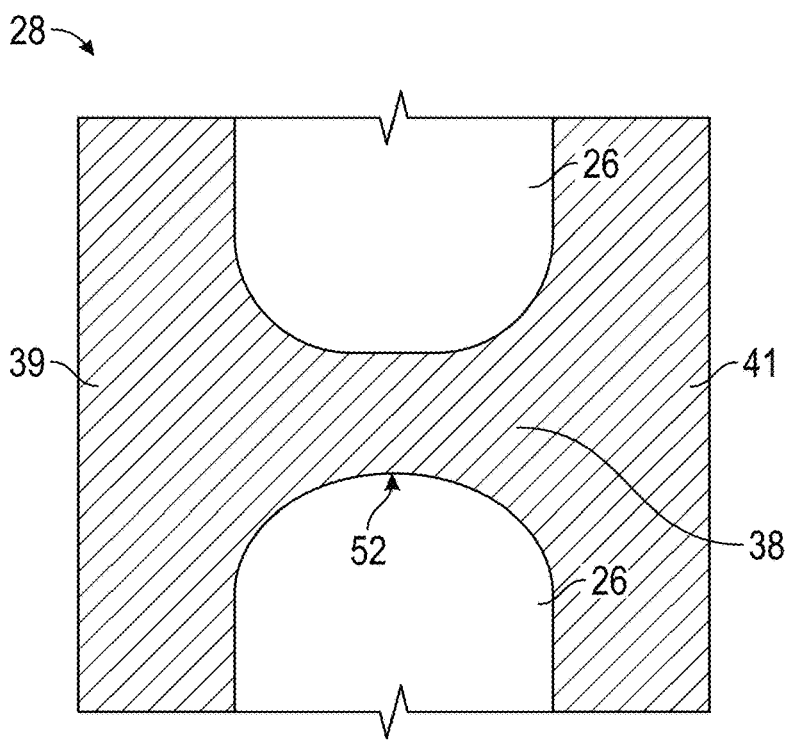
FIG. 3B is a cross-sectional view of the airfoil along lines 3-3 of FIG. 2A according to another embodiment.

Referring now to FIGS. 3A and 3B, a cross sectional view of a lowermost pedestal according to various embodiments of the present disclosure is illustrated. In FIG. 3A, a bottom 50 of the fillet of the lowermost pedestal is flat while the bottom 52 of the fillet in the FIG. 3B is curved or has intersecting fillets.

In various embodiments, the angle that the "bottoms" of the pedestals form with the horizontal may be very slight, down to 1 degree from the horizontal (FIG. 3A). Of course, other configurations are considered to be within the scope of various embodiments of the present invention. The "bottom" means the lowermost ID location on the pedestal that is not on the pedestal fillet. In the case where the pedestal fillet towards the ID of the pedestal transitions directly into a fillet on the opposite wall, the "bottom" is the ID most location at the intersection of these fillets (FIG. 3B). The pedestals 38 can be of any shape and size. The concept applies equally to a refractory metal core (RMC) or ceramic cores. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component for a gas turbine engine, the component comprising:
   a platform;
   an airfoil secured to and extending radially from the platform, the airfoil having an exterior surface extending from a leading edge and a trailing edge;
   an internal cooling cavity located within the airfoil;
   an array of pedestals located adjacent to the platform, the array of pedestals comprising a first row of pedestals extending between opposite sides of the internal cavity and a second row of pedestals directly adjacent to the first row of pedestals and extending between opposite sides of the internal cavity, wherein the entire first row of pedestals are further from the trailing edge than the second row of pedestals and the second row of pedestals are closer to the trailing edge than any other pedestals of the array of pedestals and a lowermost pedestal of the first row of pedestals is further from the platform than a lowermost pedestal of the second row of pedestals, wherein the lowermost pedestal of the second row of pedestals is closer to the platform than any other pedestal of airfoil; and
   a plurality of cooling openings located between the trailing edge and the second row of pedestals, the plurality of cooling openings being in fluid communication with the internal cooling cavity.

2. The component as in claim 1, wherein a surface of the pedestals facing the platform is configured to have a flat surface extending between the opposite sides of the internal cavity.

3. The component as in claim 1, wherein a surface of the pedestals facing the platform is configured to have a curved surface extending between the opposite sides of the internal cavity.

4. The component as in claim 1, wherein the first row of pedestals are aligned with each other and the array of pedestals only comprises the first row of pedestals and the second row of pedestals.

5. The component as in claim 4, wherein the second row of pedestals are aligned with each other and parallel to the first row of pedestals.

6. The component as in claim 1, wherein a surface of the pedestals facing the platform is configured to have either a flat surface extending between the opposite sides of the internal cavity or a curved surface extending between the opposite sides of the internal cavity.

7. The component as in claim 1, further comprising a third row of pedestals directly adjacent to the first row of pedestals, wherein the third row of pedestals are further from the trailing edge than the first row of pedestals and the lowermost pedestal of the third row of pedestals is further from the platform than a lowermost pedestal of the first row of pedestals.

8. The component as in claim 1, wherein the component is a rotor blade of a gas turbine engine.

9. The component as in claim 8, wherein the blade has a plurality of cooling openings in the exterior surface of the blade proximate to the trailing edge, wherein the plurality of cooling openings are in fluid communication with the internal cooling cavity.

10. A blade for a gas turbine engine, the blade comprising:
   an airfoil;
   a platform secured to the airfoil, the airfoil having an exterior surface extending from a leading edge to a trailing edge;
   an internal cooling cavity located within the airfoil; and
   an array of pedestals located adjacent to the platform and extending between opposite sides of the internal cavity, the array of pedestals including a first row of pedestals and a second row of pedestals directly adjacent to the first row of pedestals, wherein the entire first row of pedestals are further from the trailing edge than the second row of pedestals and the second row of pedestals are closer to the trailing edge than any other pedestals of the array of pedestals and a lowermost pedestal of the first row of pedestals is further from the platform than a lowermost pedestal of the second row of pedestals, wherein the lowermost pedestal of the second row of pedestals is closer to the platform than any other pedestal of the airfoil; and
   a plurality of cooling openings located between the trailing edge and the second row of pedestals, the plurality of cooling openings being in fluid communication with the internal cooling cavity.

11. The blade as in claim 10, wherein a surface of the pedestals facing the platform is configured to have a flat surface extending between the opposite sides of the internal cavity.

12. The blade as in claim 10, wherein a surface of the pedestals facing the platform is configured to have a curved surface extending between the opposite sides of the internal cavity.

13. The blade as in claim 10, wherein the first row of pedestals are aligned with each other and the array of pedestals only comprises the first row of pedestals and the second row of pedestals.

14. The blade as in claim 10, wherein the second row of pedestals are aligned with each other and parallel to the first row of pedestals.

15. The blade as in claim 10, a surface of the pedestals facing the platform is configured to have either a flat surface extending between the opposite sides of the internal cavity or a curved surface extending between the opposite sides of the internal cavity.

16. The blade as in claim 10, wherein the array of pedestals further comprises a third row of pedestals directly adjacent to the first row of pedestals, wherein the third row of pedestals are farther from the trailing edge than the first row of pedestals and the lowermost pedestal of the third row of pedestals is further from the platform than a lowermost pedestal of the first row of pedestals.

17. The blade as in claim 10, wherein the blade has a plurality of cooling openings in the exterior surface of the blade proximate to the trailing edge, wherein the plurality of cooling openings are in fluid communication with the internal cooling cavity.

18. A method of forming a cooling path in a blade of a gas turbine engine, the method comprising:
   fluidly coupling an exterior surface of the blade to an internal cooling cavity located in an airfoil via a plurality of openings in the airfoil proximate to a trailing edge of the airfoil; and
   locating an array of pedestals within the internal cooling cavity, the array of pedestals extending between opposite sides of the internal cavity and including a first row of pedestals and a second row of pedestals, the second row of pedestals being directly adjacent to the first row of pedestals, wherein the entire first row of pedestals are further from the trailing edge than the second row of pedestals and the second row of pedestals are closer to the trailing edge than any other pedestals of the array of pedestals and a lowermost pedestal of the first row of pedestals is further from a platform secured to the blade than a lowermost pedestal of the second row of pedestals, wherein the lowermost pedestal of the second row of pedestals is closer to the platform than any other pedestal of the airfoil; and wherein the plurality of openings are located between the trailing edge and the second row of pedestals, the plurality of openings being in fluid communication with the internal cooling cavity.

19. The method as in claim 18, wherein the array of pedestals further comprises a third row of pedestals directly adjacent to the first row of pedestals, wherein the third row of pedestals are further from the trailing edge than the first row of pedestals and the lowermost pedestal of the third row of pedestals is further from the platform than a lowermost pedestal of the first row of pedestals.

20. The method as in claim 18, wherein the first row of pedestals are aligned with each other and wherein the second row of pedestals are aligned with each other and parallel to the first row of pedestals.

* * * * *